Patented Dec. 22, 1942

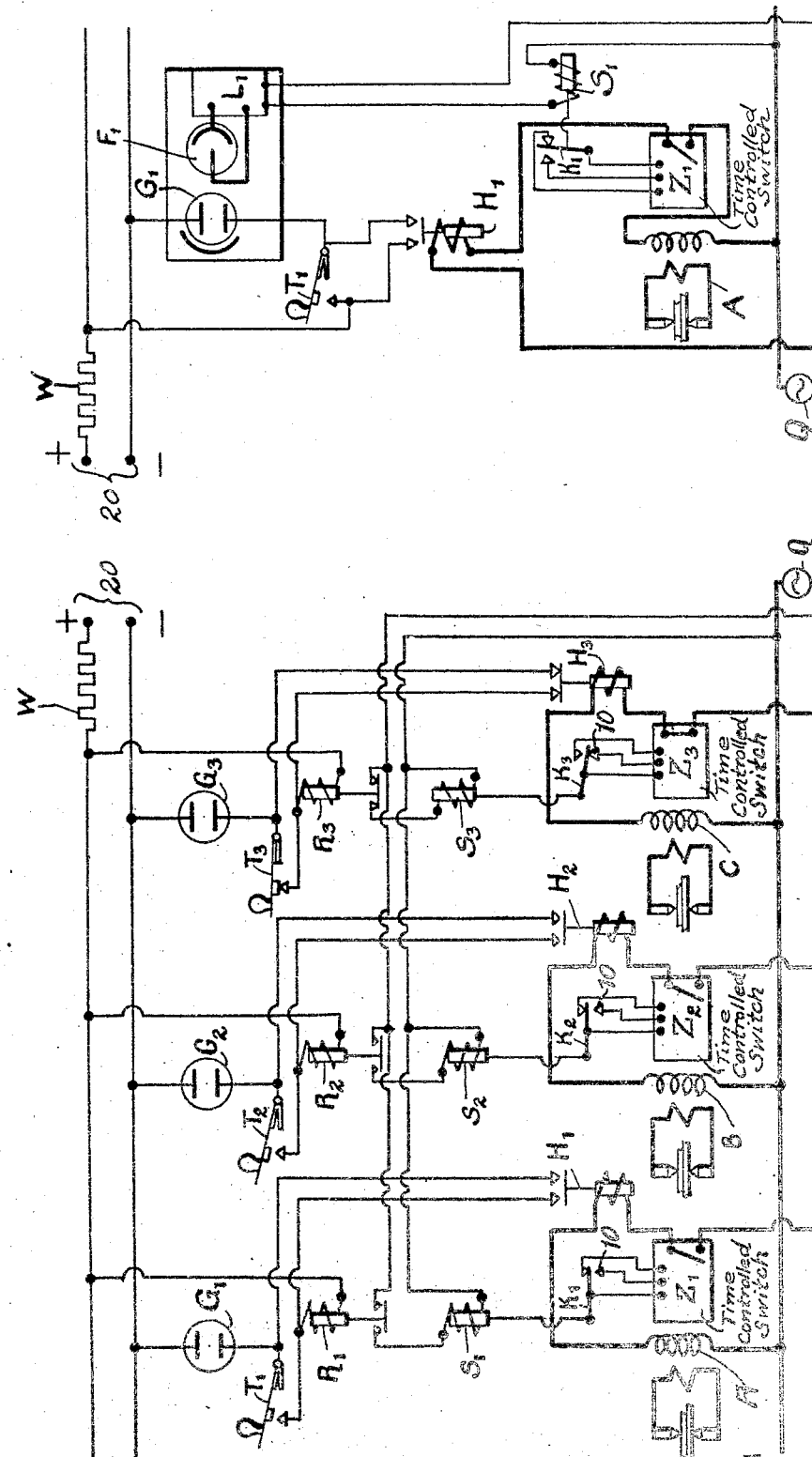

2,305,773

UNITED STATES PATENT OFFICE 2,305,773

CONTROL SYSTEM

Gerhard Hagedorn, Berlin-Lichterfelde, Germany; vested in the Alien Property Custodian Application March 7, 1941, Serial No. 382,246
In Germany March 11, 1940

3 Claims. (Cl. 171—97)

The present invention relates to control systems for a plurality of electric welding devices or electrical loads and more particularly pertains to control means for preventing simultaneous loading of a supply source with such devices or loads.

The load drawn by an electric resistance welding device or other electrical devices usually amounts to considerable energy up to 400 KVA. and such a load is disadvantageous if the network or generator supplying such devices is simultaneously loaded with several welding machines or loads. The voltage drop of the supply resulting from the simultaneous operation of two or more welding devices is undesirable inasmuch as such a voltage drop will provide irregular weld spots.

An object of the invention therefore resides in providing control means for preventing operation of several welding devices which are adapted to be supplied from a common source of current.

A more specific object of the invention pertains to control systems wherein a glow discharge tube is arranged in the control circuit of each device which is ignited before the operation of the associated device or machine is initiated and the control means includes means for reducing the voltage supplied to the other glow discharge tubes when one of the tubes is ignited so that the voltage supplied to all other glow discharge tubes is below the ignition values thereof.

A more specific object of the invention pertains to an auxiliary supply for the glow discharge tubes in the control circuits of the machines or devices including a resistor in the auxiliary supply circuit having such a value in relation to the ignition voltage value of the glow discharge tubes and the voltage of the auxiliary supply that the voltage drop across the resistor when one of the glow discharge tubes is ignited is sufficient to prevent ignition of the other glow discharge tubes.

Other and further objects and features of the invention will be apparent from a consideration of the accompanying drawing and following description wherein several exemplary embodiments of the invention are disclosed.

In the drawing:

Fig. 1 is a diagram of a control system for welding devices embodying the invention.

Fig. 2 is a diagram of part of a modified control system for electric welding devices.

Referring to the drawing and particularly to Fig. 1 there is shown at A, B and C a plurality of load or welding transformers. The primary of each transformer is adapted to be connected across the terminals of a common electrical source Q. The primary circuit of each transformer is connected in series circuit relationship with a time switch such as $Z_1$, $Z_2$ and $Z_3$. The primary circuit of each transformer also includes in series circuit relationship therewith a winding of a relay $H_1$, $H_2$ and $H_3$. The welding period of each machine is initiated by the contact arms $K_1$, $K_2$ and $K_3$ when these contact arms engage the contacts 10 and when the windings of the associated relays $S_1$, $S_2$ and $S_3$ are energized.

The control circuits for the welding devices each include a glow discharge tube $G_1$, $G_2$ and $G_3$. These glow discharge tubes are all connected across an auxiliary supply circuit 20 which includes a resistor W. Each of the control circuits is completed through the associated glow discharge tube by means of a manually operable switch or key $T_1$, $T_2$ and $T_3$. Each control circuit also includes the winding of a relay $R_1$, $R_2$ and $R_3$. The contacts of the relays $R_1$, $R_2$ and $R_3$ when closed are arranged to complete circuits for supplying current to the relay windings $S_1$, $S_2$ and $S_3$ from the source Q.

In operation and if the manually operable key $T_3$ is depressed the full voltage of the auxiliary supply 20 is impressed across the glow discharge tube $G_3$. The tube $G_3$ is thus ignited and current flows through the circuit thereof to energize the winding of the relay $R_3$. The current drawn by this control circuit causes a voltage drop across the resistor W which is sufficient to lower the voltage of the auxiliary supply below the ignition voltage of the glow discharge tubes $G_1$ and $G_2$. The contacts of the relay $R_3$ and closed when the tube $G_3$ is ignited and current from the source Q is supplied to the winding of the relay $S_3$. The contact arm $K_3$ is thus swung downwardly into engagement with the contact 10 whereby time control switch $Z_3$ closes the primary circuit of the welding transformer C across the terminals of the source Q.

The manually operable key $T_3$ may then be released but the circuit through the glow discharge tube $G_3$ is maintained by the holding-in contacts of the relay $H_3$ which is actuated when current flows in the primary circuit of the transformer C. The circuit of the glow discharge tube $G_3$ is thus maintained and the voltage of the auxiliary supply remains at a reduced value so that the welding transformers A and B cannot therefore be connected across the circuit of the supply Q since the glow discharge tubes $G_1$ and $G_2$ cannot be ignited as long as the circuit of the glow discharge tube $G_3$ is energized.

The welding operation is controlled by the time switch $Z_3$ and after the lapse of a predetermined time interval the primary circuit of the welding transformer C is opened by the time control switch $Z_3$ and the holding-in contacts of the relay $H_3$ are then opened. The circuit of the glow discharge tube $G_3$ is thus interrupted and the winding of the relay $R_3$ is de-energized and the contacts thereof open the circuits supplying the winding of the relay $S_3$. The switch arm $K_3$ is thus permitted to return to its initial position. After the contacts of the relay $H_3$ have opened, another welding device may be connected across the current supply Q. Thus the welding current source Q will never be overloaded by simultaneous operation of several of the welding transformers or load-circuits.

In Fig. 2 the load produced upon ignition of a glow discharge tube $G_1$ for example is directed upon a photocell $F_1$ which in turn actuates a relay $L_1$ of a suitable type which completes a circuit to the winding of a relay $S_1$. In this arrangement the current drawn by the control circuit which includes the glow discharge tube $G_1$ is sufficient to reduce the voltage of the auxiliary supply 20 below the ignition value of any other glow discharge tube connected across the auxiliary source.

In all of the control arrangements the resistance W is of such a value that the first glow discharge tube to be ignited will cause such a voltage drop across the resistor W as to prevent the ignition of all other glow discharge tubes. Even if two key switches are closed at substantially the same time the glow discharge tube requiring the shortest period for ignition will ignite first and the welding device or the heating device associated with the ignited glow discharge tube will be connected to the main source Q and the glow discharge tube associated with the other key will not be ignited until the first welding device or heating device is disconnected from the main source.

While the invention has been described with reference to specific types of electrical devices and specific circuit arrangements it will be appreciated that changes may be made without departing from the spirit and scope of the invention as set forth in the appended claims.

I claim:

1. An electrical control system comprising, a load circuit, a second load circuit, a main source of current for energizing both load circuits, an auxiliary supply circuit, a resistor in said auxiliary supply circuit, a relay including a winding therefor, a glow discharge tube, a circuit including a manually operable switch for connecting the relay winding and the glow discharge tube in series circuit relation across said auxiliary supply circuit, means responsive to the actuation of said relay for momentarily connecting the first load circuit to said main source, a second relay having a winding, a second glow discharge tube, a circuit including a manually operable switch for connecting the second glow discharge tube and the winding of the second relay in series circuit relation across said auxiliary supply circuit, means responsive to the actuation of the second relay for momentarily connecting the second load circuit to said main source, and the ignition voltage value of each glow discharge tube and the voltage of said auxiliary supply and the resistance of said resistor being of such values that the voltage drop across said resistor when one of said relay windings is energized is sufficient to prevent ignition of the other glow discharge tube.

2. An electrical control system for initiating individual energization of a plurality of load circuits comprising, a main source of current for energizing all of the load circuits, an auxiliary supply circuit, a resistor in said auxiliary supply circuit, a glow discharge tube adapted to be ignited at full voltage of said auxiliary supply, a control circuit including a manually operable switch for connecting said glow discharge tube across said auxiliary supply circuit, means responsive to the energization of said control circuit for momentarily connecting one of the load circuits to said main source, a second glow discharge tube adapted to be ignited at full voltage of said auxiliary supply, a control circuit including a manually operable switch for connecting the second glow discharge tube across said auxiliary supply circuit, means responsive to the energization of the last mentioned control circuit for connecting another of said load circuits to said main source, and the resistance of said resistor being of such a value that the voltage drop thereacross when one of the glow discharge tubes is ignited being sufficient to prevent ignition of another glow discharge tube.

3. An electrical control system for initiating individual energization of a plurality of load circuits comprising, a main source of current for individually supplying all of the load circuits, an auxiliary supply, a glow discharge tube adapted to be ignited at full voltage of said auxiliary supply, a control circuit for connecting said glow discharge tube across said auxiliary supply, means responsive to the energization of said control circuit for momentarily connecting one of the load circuits to said main source, a second glow discharge tube adapted to be ignited at full voltage of said auxiliary supply, a control circuit for connecting the second glow discharge tube across said auxiliary supply, means responsive to the energization of the last mentioned control circuit for connecting another of said load circuits to said main source, and means responsive to the ignition of one of said glow discharge tubes for reducing the voltage of said auxiliary supply below the ignition value of another glow discharge tube.

GERHARD HAGEDORN.